United States Patent
Luo et al.

(10) Patent No.: US 9,801,144 B2
(45) Date of Patent: Oct. 24, 2017

(54) UPLINK POWER CONTROL METHOD AND DEVICE

(71) Applicant: Huawei Technologies Co., Ltd., Shenzhen (CN)

(72) Inventors: Zezhou Luo, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/947,522

(22) Filed: Nov. 20, 2015

(65) Prior Publication Data

US 2016/0081036 A1 Mar. 17, 2016

Related U.S. Application Data

(63) Continuation of application No. PCT/CN2013/085333, filed on Oct. 16, 2013.

(30) Foreign Application Priority Data

May 23, 2013 (CN) .......................... 2013 1 0196155

(51) Int. Cl.
*H04W 52/18* (2009.01)
*H04W 52/34* (2009.01)
*H04W 24/02* (2009.01)
*H04W 72/04* (2009.01)
(Continued)

(52) U.S. Cl.
CPC ............ *H04W 52/18* (2013.01); *H04W 24/02* (2013.01); *H04W 52/242* (2013.01); *H04W 52/343* (2013.01); *H04W 72/0473* (2013.01); *H04W 52/146* (2013.01)

(58) Field of Classification Search
None
See application file for complete search history.

(56) References Cited

U.S. PATENT DOCUMENTS

| 9,332,458 | B2 * | 5/2016 | Nuss ...................... H04W 28/08 |
| 2008/0081564 | A1 | 4/2008 | Rao |
| 2013/0069650 | A1 | 3/2013 | Abe |

(Continued)

FOREIGN PATENT DOCUMENTS

| CN | 1355625 A | 6/2002 |
| CN | 1355626 A | 6/2002 |

(Continued)

*Primary Examiner* — Brian Roberts
(74) *Attorney, Agent, or Firm* — Leydig, Voit & Mayer, Ltd.

(57) ABSTRACT

Provided in the embodiment of the present invention are a method for uplink power control and an integrated control point apparatus. The method comprises: obtaining the uplink load information of a plurality of cells; identifying cells of a first type and cells of a second type among the plurality of cells; determining at least one cell cluster according to the neighboring relationship of the cells of the first type, the cells of the second type and the plurality of cells, wherein any cell cluster in the at least one cell cluster comprises at least one cell of the first type, and the cell of the first type or the cell of the second type neighboring the at least one cell of the first type; and performing joint optimization of uplink power control parameters on every cell cluster in the at least one cell cluster.

20 Claims, 5 Drawing Sheets

(51) Int. Cl.
*H04W 52/24* (2009.01)
*H04W 52/14* (2009.01)

(56) References Cited

U.S. PATENT DOCUMENTS

| | | | | |
|---|---|---|---|---|
| 2013/0195013 A1* | 8/2013 | Ahn | ............... | H04W 72/1215 |
| | | | | 370/328 |
| 2013/0250908 A1* | 9/2013 | Bach | ............... | H04W 52/0206 |
| | | | | 370/331 |
| 2013/0286851 A1* | 10/2013 | Moser | ............... | H04W 88/10 |
| | | | | 370/241.1 |
| 2015/0257147 A1* | 9/2015 | Ji | ............... | H04W 16/14 |
| | | | | 370/329 |

FOREIGN PATENT DOCUMENTS

| | | |
|---|---|---|
| CN | 101494895 A | 7/2009 |
| CN | 102098728 A | 6/2011 |
| CN | 102487511 A | 6/2012 |
| CN | 102905317 A | 1/2013 |
| CN | 102905617 A | 1/2013 |
| WO | WO 2012059044 A1 | 5/2012 |

\* cited by examiner

UPLINK POWER CONTROL METHOD AND DEVICE

CROSS-REFERENCE TO RELATED APPLICATIONS

This application is a continuation of International Application No. PCT/CN2013/085333, filed on Oct. 16, 2013, which claims priority to Chinese Patent Application No. 201310196155.2 filed on May 23, 2013, both of which are hereby incorporated by reference in their entireties.

FIELD OF THE TECHNOLOGY

The present application relates to the field of communication, and particularly to a method for controlling uplink power and a device thereof.

BACKGROUND

In LTE standards, control parameters of basic working point of uplink power include an uplink power reference value PO_PUSCH (P0) and a path loss compensation factor α, which are also called as open-loop control parameters for the reason that the basic working point does not depend on dynamic measurement feedback of users. Control parameters of dynamic offset include a control factor related to transmission format and a direct control factor, which are also called as closed-loop control parameters for the reason that their specific values depend on the dynamic measurement feedback from a single user. The control parameter PO_PUSCH of basic working point is classified into a cell-level parameter $P_{cell\_specific}$ and a user-level parameter $P_{UE\_specific}$, where the cell-level parameter is a uniform parameter for the whole cell, and the user-level parameter is for a single user to compensate for system deviation or measurement error of the user. From an application perspective, the basic working point parameter may be used to optimize a long-term performance at cell level or network level, and the dynamic offset parameter may be used to optimize short-term performance for a single user.

In conventional technology, a correction value POffset (ΔPL) for PO_PUSCH is determined based on the path loss of a single UE with respect to a serving cell (Serving Cell) and a victim cell (Victim Cell), to optimize the parameter PO_PUSCH and improve the throughput at cell edge. However, in this manner the optimization is mainly applied on the uplink power control parameter $P_{UE\_specific}$ for the single user, and the cell-level parameter $P_{cell\_specific}$ and the path loss compensation factor α are not optimized, thus the long-term performance at cell level or network level is not optimized.

SUMMARY

A method for controlling uplink power and a device thereof are provided according to the embodiments of the disclosure, which may avoid a load imbalance problem.

In one aspect, a method for controlling uplink power is provided. The method includes:

obtaining uplink load information of a plurality of cells; identifying cells of a first type and cells of a second type in the plurality of cells, wherein an uplink load of the cell of the first type is greater than a predetermined threshold, the uplink load of the cell of the second type is less than or equal to the predetermined threshold; determining at least one cell cluster based on the cells of the first type, the cells of the second type and a neighbor relationship of the multiple cells, where any cell cluster among the at least one cell cluster includes at least one cell of the first type and cell(s) of the first type or the second type adjacent to the at least one cell of the first type; and performing joint optimization of an uplink power control parameter on each cell cluster in the at least one cell cluster.

In combination with the above aspect, in a first possible implementation, the cell cluster comprises one cell of the first type; or any cell of the first type in the cell cluster is spaced from the nearest cell of the first type by at most one cell of the second type.

In combination with the above aspect or the first possible implementation in the above aspect, in a second possible implementation, the determining at least one cell cluster based on the cells of the first type, the cells of the second type and the neighbor relationship of the plurality of cells includes: determining one cell of the first type as a member of the cell cluster; determining a cell of the first type or a cell of the second type, which is adjacent to the cell of the first type in the cell cluster, as a member of the cell cluster; and determining a cell of the first type, which is adjacent to a cell of the second type in the cell cluster, as a member of the cell cluster.

In combination with the above aspect, the first possible implementation in the above aspect, or the second possible implementation in the above aspect, in a third possible implementation, the method further includes obtaining the neighbor relationship of the plurality of cells.

In combination with the above aspect, or any possible implementation among the first possible implementation in the above aspect to the third possible implementation in the above aspect, in a fourth possible implementation, the performing joint optimization of an uplink power control parameter on each cell cluster in the at least one cell cluster includes: determining uplink power control adjustment parameters of respective cells in a first cell cluster among the at least one cell cluster; and sending the uplink power control adjustment parameters of respective cells to the respective cells in the first cell cluster, for the respective cells to perform uplink power control adjustment.

In combination with the fourth possible implementation in the above aspect, in a fifth possible implementation, the determining the uplink power control adjustment parameters of respective cells in the first cell cluster among the at least one cell cluster includes: determining a cell cluster uplink power control adjustment parameter of the first cell cluster based on a gradient of a load function, wherein the load function is a function of an average uplink load of the first cell cluster with respect to the uplink power control parameter of the first cell cluster, the gradient is a partial derivative of the load function with respect to a cell cluster uplink power control parameter of the first cell cluster, the cell cluster uplink power control parameter of the first cell cluster is a vector consisting of uplink power control parameters of respective cells in the first cell cluster, and the cell cluster uplink power control adjustment parameter of the first cell cluster is an adjusted cell cluster uplink power control parameter of the first cell cluster.

In combination with the fifth possible implementation in the above aspect, in a sixth possible implementation, the determining the cell cluster uplink power control adjustment parameter of the first cell cluster based on a gradient of a load function includes: determining at least one candidate average uplink load based on the gradient of the load function, wherein the at least one candidate average uplink load is the average uplink load corresponding to a minimum value point of the load function; determining a smallest one of the at least one candidate average uplink load as an estimated average uplink load after adjustment of the first cell cluster; and determining the cell cluster uplink power control parameter corresponding to the estimated average uplink load after adjustment as the cell cluster uplink power control adjustment parameter of the first cell cluster.

In combination with the sixth possible implementation in the above aspect, in a seventh possible implementation, the determining at least one candidate average uplink load based on the gradient of the load function includes: obtaining at least one extreme value point when the gradient of the load function is zero; and determining the average uplink load corresponding to one of the at least one extreme value point as one of the at least one candidate average uplink load.

In combination with the sixth possible implementation in the above aspect, in a eighth possible implementation, the determining at least one candidate average uplink load based on the gradient of the load function includes: choosing at least one cell cluster uplink power control parameter of the first cell cluster at random or based on a predetermined strategy; and determining, based on negative gradient curve of the gradient, an average uplink load corresponding to a minimum value point, to which one of the at least one cell cluster uplink power control parameter converges on the load function, as the at least one candidate average uplink load.

In combination with the sixth possible implementation in the above aspect, in a ninth possible implementation, the determining at least one candidate average uplink load based on the gradient of the load function includes: randomly shifting one of the at least one candidate average uplink load on the curve corresponding to the load function, to obtain a shifted uplink power control parameter of the first cell cluster; and determining, based on negative gradient curve of the gradient equation, an average uplink load corresponding to a minimum value point to which the shifted uplink power control parameter converges on the load function as the candidate average uplink load.

In a second aspect, a coordinator device is provided. The device includes: an obtaining unit, configured to obtain uplink load information of a plurality of cells; an identifying unit, configured to identify cells of a first type and cells of a second type in the plurality of cells, where an uplink load of the cell of the first type is greater than a predetermined threshold, and the uplink load of the cell of the second type is less than or equal to a predetermined threshold; a determining unit, configured to determine at least one cell cluster based on the cells of the first type, the cells of the second type and a neighbor relationship of the multiple cells, where any cell cluster among the at least one cell cluster includes at least one cell of the first type and cell(s) of the first type or the second type adjacent to the at least one cell of the first type; and a power control adjustment unit, configured to perform joint optimization of the uplink power control parameter on each cell cluster in the at least one cell cluster.

In combination with the second aspect, in a first possible implementation, the cell cluster includes one cell of the first type; or any cell of the first type in the cell cluster is spaced from the nearest cell of the first type by at most one cell of the second type.

In combination with the second aspect or the first possible implementation in the second aspect, in a second possible implementation, the determining unit is configured to: determine one cell of the first type as a member of the cell cluster; determine a cell of the first type or a cell of the second type, which is adjacent to the cell of the first type in the cell cluster, as a member of the cell cluster; and determine a cell of the first type, which is adjacent to a cell of the second type in the cell cluster, as a member of the cell cluster.

In combination with the second aspect, the first possible implementation in the second aspect, or the second possible implementation in the second aspect, in a third possible implementation, the obtaining unit is configured to further obtain the neighbor relationship of the plurality of cells.

In combination with the second aspect or any possible implementation among the first possible implementation in the second aspect to the third possible implementation in the second aspect, in a fourth possible implementation, the power control adjustment unit is configured to: determine uplink power control adjustment parameters of respective cells in a first cell cluster among the at least one cell cluster; and send the uplink power control adjustment parameters of respective cells to the respective cells in the first cell cluster, for the respective cells to perform uplink power control adjustment.

In combination with the fourth possible implementation in the second aspect, in a fifth possible implementation, the power control adjustment unit is configured to determine a power control adjustment parameter of the first cell cluster based on a gradient of a load function, wherein the load function is a function of an average uplink load of the first cell cluster with respect to the uplink power control parameter of the first cell cluster, the gradient is a partial derivative of the load function with respect to the uplink power control parameter of the first cell cluster.

In combination with the fifth possible implementation in the second aspect, in a sixth possible implementation, the power control adjustment unit includes: a first determining subunit, configure to determine at least one candidate average uplink load based on the gradient of the load function, wherein the at least one candidate average uplink load is the average uplink load corresponding to a minimum value point of the load function; a second determining subunit, configure to determine a smallest one of the at least one candidate average uplink load as an estimated average uplink load after adjustment of the first cell cluster; and a third determining subunit, configure to determine the uplink power control parameter corresponding to the estimated average uplink load after adjustment as the uplink power control adjustment parameter of the first cell cluster.

In combination with the sixth possible implementation in the second aspect, in a seventh possible implementation, the first determining subunit is configured to obtain at least one extreme value point when the gradient of the load function is zero, and determine the average uplink load corresponding to one of the at least one extreme value point as one of the at least one candidate average uplink load.

In combination with the sixth possible implementation in the second aspect, in a eighth possible implementation, the first determining subunit is configured to choose at least one group of uplink power control adjustment parameters of the first cell cluster at random or based on a predetermined strategy, and determine, based on negative gradient curve of the gradient, an average uplink load corresponding to a minimum value point, to which one among the at least one group of first uplink power control parameters converges on the load function, as one of the at least one candidate average uplink load, where the one among the at least one group of uplink power control adjustment parameters comprises one uplink power control adjustment parameter of each cell in the cell cluster.

In combination with the sixth possible implementation in the second aspect, in a ninth possible implementation, the first determining subunit is configured to randomly shift one of the at least one candidate average uplink load on the curve corresponding to the load function, to obtain a shifted uplink power control parameter of the first cell cluster, and determine, based on negative gradient curve of the gradient equation, an average uplink load corresponding to a minimum value point to which the shifted uplink power control parameter converges on the load function as the candidate average uplink load.

Based on the above technical solution, in the method for controlling uplink power and the device thereof according to the embodiment of the disclosure, the overloaded cell is distinguished based on the uplink load information of a plurality of cells, and the overloaded cell and an underloaded cell adjacent to the overloaded cell are classified into the cell cluster, for the joint optimization of the uplink power control parameter, thus uplink interference in the cell cluster is effectively coordinated, and a load imbalance is avoided.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, the drawings in the following description are only a part of rather than all of the embodiments of the disclosure, and other drawings may be obtained by those skilled in the art according to those drawings without creative effort.

DETAILED DESCRIPTION OF THE EMBODIMENTS

Hereinafter, the technical solutions according to the embodiments of the disclosure are described clearly and completely in conjunction with the drawings. Apparently, the described embodiments are only a part of rather than all of the embodiments of the disclosure. All the other embodiments obtained by those skilled in the art based on the embodiments of the disclosure without creative effort fall within the protection scope of the disclosure.

It should be understood that, the technical solution according to the embodiment of the disclosure may be applied to OFDM system and various communication systems using an uplink power control mechanism with partial path loss compensation, such as wireless microwave access (Wireless Microwave Access, WiMax) system, long term evolution (LTE, Long Term Evolution) system, frequency division duplex (FDD, Frequency Division Duplex) system, and time division duplex (TDD, Time Division Duplex) system.

A terminal (Terminal) may be called as user equipment (UE, User Equipment), mobile station (MS, Mobile Station), user device and so on, and may communicate with one or more core networks through radio access network (RAN, radio access network). The terminal may be a mobile terminal such as mobile phone (or called as 'cell phone'), or a computer with the mobile terminal, such as portable mobile device, pocket mobile device, handheld mobile device, mobile device built into computer, or vehicle-mounted mobile device, which exchange language and/or data with the radio access network.

A base station may be a base transceiver station (BTS, Base Transceiver Station) in a GSM or CDMA system, a NodeB (NodeB) in a WCDMA system, or an eNB (eNB or e-NodeB, evolutional Node B) in the LTE system, which is not limited herein. For convenience of description, the eNB is taken as an example for illustration in the following embodiments.

A coordinators (eCoordinator) represents a unit coordinating a multi-mode network, and a deployment location for the coordinator is not limited. The coordinator may be deployed separately, e.g., in an independent element management system (Element Management System, EMS) entity, or may be deployed in a mobility management entity (Mobility Management Entity, MME), gateway, controller or base station. In other words, the coordinator may be an independent device, or be deployed in another device.

Figure 1:
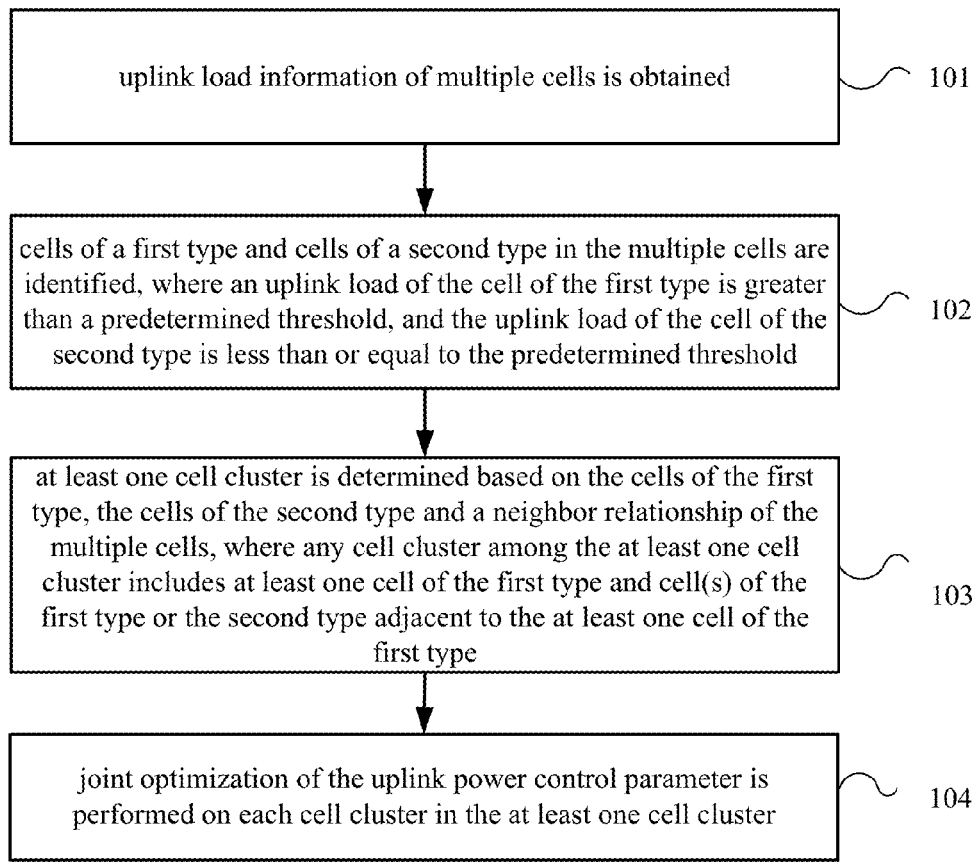
FIG. 1 is a flow chart of a method for controlling uplink power according to an embodiment of the disclosure.

FIG. 1 is a flow chart of a method for controlling uplink power according to an embodiment of the disclosure. The method in FIG. 1 is executed by the coordinator.

101, uplink load information of multiple cells is obtained.

102, cells of a first type and cells of a second type in the multiple cells are identified.

An uplink load of the cell of the first type is greater than a predetermined threshold, and the uplink load of the cell of the second type is less than or equal to the predetermined threshold. In other words, the cell of the first type is an overloaded cell, and the cell of the second type is a normal cell.

103, at least one cell cluster is determined based on the cells of the first type, the cells of the second type and a neighbor relationship of the multiple cells.

Any cell cluster among the at least one cell cluster includes at least one cell of the first type and cell(s) of the first type or the second type adjacent to the at least one cell of the first type.

104, joint optimization of the uplink power control parameter is performed on each cell cluster in the at least one cell cluster.

According to the embodiment, the overloaded cell is distinguished based on the uplink load information of multiple cells, and the overloaded cell and underloaded cell(s) adjacent to the overloaded cell are classified into a cell cluster, for the joint optimization of the uplink power control parameter, thus uplink interference in the cell cluster is effectively coordinated, and a load imbalance is avoided.

In addition, according to the embodiment, the uplink power control parameter of the cell is adjusted through clustering, stability of network status is ensured effectively, and optimization overhead is reduced.

According to the embodiment, the uplink load information of multiple cells is obtained by the base station to which the cell belongs. Cell c is taken as example. The cell uplink load information sent from cell c may be obtained by the base station to which the cell c belongs based on transmission power of a user in cell c, the path loss from the user in cell c to the cell, and bandwidth and rate required for the user in cell c. Specifically, the uplink load information of cell c may be obtained from the following equation.

$$R_{m,c} = \exp\left(\frac{P_m - PL_{m,c}}{10}\right). \quad (1)$$

where $P_m$ represents signal power from the user m in cell c to cell c, $PL_{m,c}$ represents the path loss from the user m in cell c to cell c, $R_{m,c}$ represents signal strength received by cell c from the user m.

$$I_c = \sum_{d \in \backslash c} \sum_{m \in M_d} \gamma_m R_{m,c} + n_{noise}. \quad (2)$$

where $n_{noise}$ represents noise power of the user cell, $\gamma_m$ represents average transmission time of user m, which is obtained by the base station through statistics, $M_d$ represents a set of users in cell d, $I_c$ represents interference on cell c from other cells in the cell cluster (cell-level interference).

$$SINR_{m,c} = \frac{N_c^{rb}}{n_m^{rb}} \cdot \frac{R_{m,c}}{I_c}. \quad (3)$$

where $n_m^{rb}$ represents average number of resource blocks (resource block, RB) occupied by a service used by user m, $N_c^{rb}$ represents number of the resource blocks in cell c, $SINR_{m,c}$ represents a signal to noise ratio in cell c.

$$W_m = B_m \times \left(\eta_{BW} \cdot \log_2\left(1 + \frac{SINR_{m,c}}{\eta_{SINR}}\right)\right)^{-1}. \quad (4)$$

where $\eta_{BW}$ represents a band efficiency factor, which is usually estimated based on experience, $\eta_{SINR}$ represents a SINR efficiency factor, which is usually estimated based on experience, $B_m$ represents a rate required for the service of a m-th user, $W_m$ represents the bandwidth required for the service of the m-th user.

$$n_m^{rb} = \frac{W_m}{W_c} N_c^{rb}. \quad (5)$$

where $W_c$ represents all bandwidth resources in cell c, $N_c^{rb}$ represents the number of the resource blocks in cell c, $n_m^{rb}$ represents average number of resource blocks (resource block, RB) occupied by service used by user m.

Substituting Equation (3) into Equation (4) on the right, and substituting Equation (5) into Equation (4) on the right, an equation on $n_m^{rb}$ may be obtained, and $n_m^{rb}$ is solved.

$$\delta_c = \sum_{m \in M_c} \frac{n_m^{rb}}{N_c^{rb}} \gamma_m. \quad (6)$$

where $\delta_c$ represents a load occupancy rate in cell c.

Based on Equation (1) to Equation (6), the uplink load information of cell c may be obtained for the cell c.

Optionally, before step 103, the method further includes obtaining the neighbor relationship of the multiple cells.

After the uplink load information of the cells is obtained, the cells may be classified based on the uplink load information of the respective cells. Specifically, a cell classifying module for implementing step 102 may be as follows.

Input: a uplink load set {Lm, m=1, . . . , M}, and a load threshold $\in_1$

Output: an identifier set of the cells of the first type (the cells with heavy uplink load) $C_H$={Cn, n=1, . . . , N}

Steps:
1. initializing $C_H$ as null, N=0;
2. polling all the cells m=1, . . . , M, and if Lm>$\in_1$, Lm→$C_H$;
3. returning the set $C_H$;
4. end.

So far, the set of cells of the first type ($C_H$) and the set of cells of the second type (cells except $C_H$) may be identified. Of course, there are other algorithms for implementing cell classification, and the disclosure is not limited herein.

Optionally, as an embodiment, in the process of cell clustering, one cell cluster includes one cell of the first type. Alternatively, optionally, as another embodiment, in the process of cell clustering, any cell of the first type in the cell cluster is spaced from the nearest cell of the first type by at most one cell of the second type.

Figure 2:
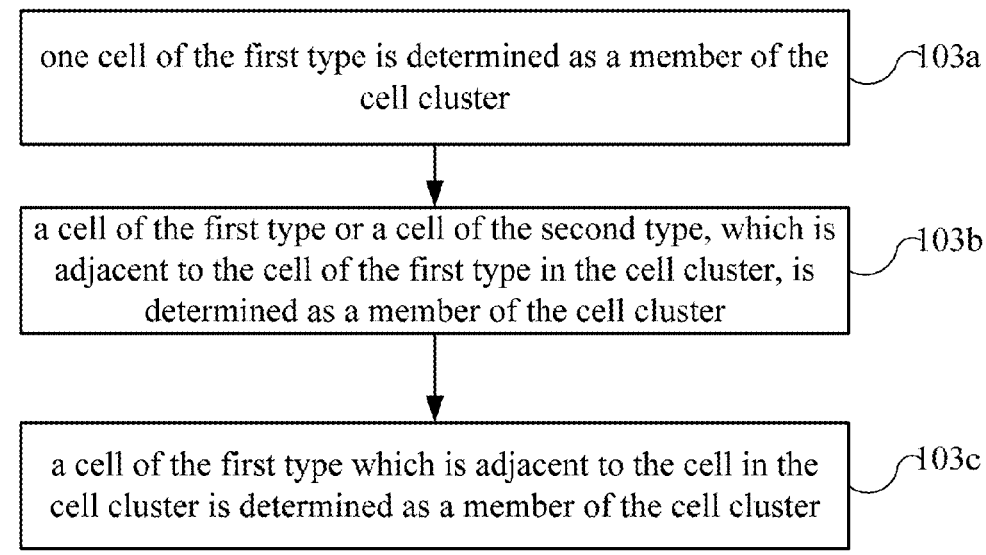
FIG. 2 is a flow chart of a method for cell clustering according to an embodiment of the disclosure.

FIG. 2 is a flow chart of a method for cell clustering according to the embodiment of the disclosure. Specifically, as shown in FIG. 2, in step 103, determining at least one cell cluster based on the cells of the first type, the cells of the second type and the neighbor relationship of the multiple cells may include steps 103a-103c.

103a, one cell of the first type is determined as a member of the cell cluster.

103b, a cell of the first type or a cell of the second type, which is adjacent to the cell of the first type in the cell cluster, is determined as a member of the cell cluster.

103c, a cell of the first type which is adjacent to the cell in the cell cluster is determined as a member of the cell cluster.

Step 103b and step 103c may be executed repeatedly.

Figure 3:
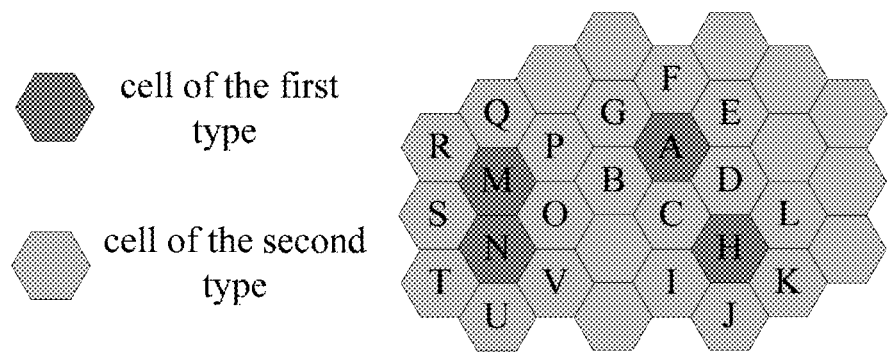
FIG. 3 is a diagram of a cell clustering scenario according to the embodiment of the disclosure.

The method for cell clustering is illustrated with the scenario in FIG. 3, where A, H, M, and N are cells of the first type, and the others are cells of the second type.

The first step, one cell of the first type may be determined as a first member of a first cell cluster based on step 103a, and it is supposed that cell A is chosen as the cell of the first type.

The second step, cells B, CD, E, F, and G may be added to the first cell cluster based on step 103b.

The third step, cell H may be added to the first cell cluster based on step 103c.

The fourth step, cells I, J, K and L may be to added to the first cell cluster based on step 103b.

So far, all members in the first cell cluster are determined. Other cell clusters are determined in similar method. Specifically, a cell clustering module for implementing the above steps may be as follows.

Input: a list $C_H$ of the heavy load cells, and neighbor cell lists of all cells NBL={NBLi, i=1, . . . , M}

Output: a set of clusters G={Gk=(Gck, Gek), k=1, . . . , K} for joint optimization Steps:
1. Initializing G as null, K=0;
2. If $C_H$ is a null, return;

3. polling all the cells $C_j$, j=1, ..., N in $C_H$
3.1 K=K+1, initializing $G_k$ as null;
3.2 if $C_j \notin G_k$, $C_j \rightarrow G_{ck}$; else, returning to the loop;
3.3 traversing the cells $C_{jp} \in NBL_{Cj}$ neighbor to Cj, and executing neib_check($C_{jp}$, NBL);
4. end.
Pseudo-codes for Function neib_check are as follows.

```
Input: identifier c of the current cell, and neighbor cell lists of all
cells NBL={ NBL_i, i=1,...,M}
  Output: nothing
  Steps:
  If c belongs to C_H
    Then
      (1) If c doesn't belong to G_k, Then c → G_ck;
      (2) call neib_check(c_q, NBL) for all c's neighbor c_q;
    Else
      Traverse all c's neighbor c_q;
      If c_q belongs to C_H
        Then
          (1) If c_q doesn't belong to G_k, Then c_q →G_ck;
          (2) call neib_check(c_q, NBL);
      If none of c_q belongs to C_H
        Then
          (1) If c_q doesn't belong to G_k, Then c_q → G_ck;
          (2) RETURN;
  End
```

Of course, the above pseudo-codes are just a specific implementation of cell clustering, and other implementation of the method based on steps 103a, 103b and 103c according to the embodiment of the disclosure also falls within the protection scope of the disclosure.

104, the joint optimization of the uplink power control parameter for each cell cluster among the at least one cell cluster may be implemented as: determining uplink power control adjustment parameters of respective cells in a first cell cluster among the at least one cell cluster; sending the uplink power control adjustment parameters of respective cells to the respective cells in the first cell cluster, for the respective cells to perform uplink power control adjustment.

Further, determining the uplink power control adjustment parameters of respective cells in the first cell cluster among the at least one cell cluster may include: determining a cell cluster uplink power control adjustment parameter for the first cell cluster based on a gradient of a load function, where the load function is the function of an average uplink load of the first cell cluster with respect to the uplink power control parameter of the first cell cluster, the gradient is a partial derivative of the load function with respect to the cell cluster uplink power control parameter for the first cell cluster, the cell cluster uplink power control parameter for the first cell cluster is a vector consisting of uplink power control parameters of respective cells in the first cell cluster, and the cell cluster uplink power control adjustment parameter for the first cell cluster is an adjusted cell cluster uplink power control parameter for the first cell cluster.

In the disclosure, the average uplink load in the first cell cluster may be actually expressed by Equation (7).

$$\Phi(\overline{P}, \overline{\alpha}) = \sum_{i \in C} \delta_i(\overline{P}, \overline{\alpha}) \quad (7)$$

where $\delta_i$ is the uplink load of the i-th cell; $\overline{P}=\{P_1, P_2, \ldots, P_C\}$ is a vector consisting of parameters $P_{cell\_specific}$ of all cells; $\overline{\alpha}=\{\alpha 1, \alpha 2, \ldots, \alpha C\}$ is a vector consisting of parameters $\alpha$ of all cells; and C is the set of cells for joint optimization. In the LTE system, values assigned to parameters P0 ($P_{cell\_specific}$) and a should follow a value-assigning range and a value-assigning mode defined in LTE standard. In other systems, the values assigned to parameters P0 ($P_{cell\_specific}$) and $\alpha$ should also follow the value-assigning range and value-assigning mode defined in the system standard.

In conjunction with Equation (1)-Equation (6), the issue of joint optimization for the cell cluster uplink power adjustment parameter may be described by Equation (8).

$$\begin{cases} \min_{\overline{P},\overline{\alpha}} \Phi(\overline{P}, \overline{\alpha}) \\ \text{s.t.} \quad P_e \leq P_e^\% + \Delta P_e, \\ \quad \alpha_e \leq \alpha_e^\% + \Delta \alpha_e \end{cases} \quad (8)$$

where $P_e$ and $\alpha_e$ are the uplink power control parameters P0 and $\alpha$ of the cell identified in step 103 as being at the edge of the cluster; $\Delta P_e$ and $\Delta \alpha_e$ are constant factors, representing an adjustment range acceptable for the parameters of the cell at the edge, which are determined through strategy of operators or experience; $P_e^\%$ and $\alpha_e^\%$ are the uplink power control parameters of the cell at the edge of the cluster before adjustment.

According to a method for solving Equation (8), the uplink power adjustment parameter of the first cell cluster is determined through calculating the gradient of $\Phi$ with respect to $\overline{P}, \overline{\alpha}$.

$$\frac{\partial \Phi}{\partial X_j} = \sum_{c \in C} f'\left(\frac{H_c}{G_c} \cdot I_c\right)\left(\frac{\partial H_c}{\partial X_j} \cdot I_c + \frac{\partial I_c}{\partial X_j} \cdot H_c\right), j = 1, \ldots, 2|C|. \quad (9)$$

where $H_c$ may be expressed by Equation (10), $G_c$ may be expressed by Equation (11), and $I_c$ may be expressed by Equation (12).

$$H_c := \int_{A_c} \frac{F_c}{W \cdot \eta_c^{BW}} \cdot \eta_c^{SINR} \cdot \frac{n_c^{rb}}{N_c^{rb}} \cdot \frac{1}{R_c(x)} dT_c(x). \quad (10)$$

where $R_c(x)$ is signal strength received by cell c from location x, $F_c$ is the bandwidth requested by the user at location x, and $H_c$ reflects the average signal strength of cell c in area $A_c$.

$$G_c := \int_{A_c} \frac{F_c}{W \cdot \eta_c^{BW}} dT_c(x). \quad (11)$$

where $T_c(x)$ represents the location distribution of users in cell c.

$$I_c := \eta_c^{noise} + \sum_{d \in C/c} \int_{A_d} \gamma_d(x) \cdot R_d(x) dT_d(x). \quad (12)$$

where $R_d(x)$ is the signal strength received by cell d from location x.

$$\frac{\partial H_c}{\partial X_j} = \begin{cases} -\sum_{x \in A_c} \frac{F}{W \cdot \eta_c^{BW}} \cdot \eta_c^{SINR} \cdot \frac{n_c^{rb}}{N_c^{rb}} \cdot T_c(x) \cdot \frac{1}{R_c(x)} \cdot \\ \frac{\ln 10}{10} \cdot \frac{\partial P_c(x)}{\partial X_j}, \text{ when } c = j \\ 0, \text{ otherwise.} \end{cases} \quad (13)$$

$$\frac{\partial I_c}{\partial X_j} = \begin{cases} \sum_{x \in A_d, d \in C/c} \gamma_d(x) \cdot T_d(x) \cdot R_d \cdot \frac{\ln 10}{10} \cdot \frac{\partial P_d(x)}{\partial X_j}, \\ \text{when } c \neq j \text{ and } d = j, \\ 0, \text{ otherwise.} \end{cases} \quad (14)$$

where $P_d(x)$ represents the signal power received by cell d from location x.

$$\frac{\partial P_c(x)}{\partial X_j} = \\ \frac{L_d(x)}{2} \cdot \left(1 + \frac{P_c^{max} - (P_c^{\textit{off}} + \alpha_c \cdot L_c(x) + 10\log n_c^{rb})}{\sqrt{\left(P_c^{max} - (P_c^{\textit{off}} + \alpha_c \cdot L_c(x) + 10\log n_c^{rb})\right)^2 + 4\eta^2}}\right), \\ j = 1, \ldots, 2|C|. \quad (15)$$

where $P_c^{max}$ represents maximum signal power received by cell c, $P_c^{\textit{off}}$ represents the path loss of received signal power of cell c, and $L_c(x)$ represents distribution of the path loss of cell c. In addition, a replacement function min(a,b) approximate to the function $$\varphi(a, b, \eta) = \frac{1}{2}\left(a + b - \sqrt{(a-b)^2 + 4\eta^2}\right), \eta > 0$$

is used, and the value of function min equals the smaller one of the two parameters a and b, where η is a parameter for controlling an approximate error, i.e., absolute value of error between the two functions is not greater than η.

Vector X={P, α} is a vector of uplink power control parameters. As may be seen from Equation(13)-Equation (15), to compute the gradient of Φ, the user location distribution $T_c(x)$ and path loss distribution $L_c(x)$ are needed, where x is the location, and c is the cell identifier. In practice, the user location distribution is usually given in grid, i.e., a coverage area is divided into areas with regular shapes (such as 50 m*50 m square grids), and the user location distribution may be obtained through counting the number of users in respective grids. The path loss distribution information may be generally obtained through simulation based on an electronic map and a path loss model. Further, the path loss model may be corrected in conjunction with a cell measurement result, in order to obtain a more accurate path loss model, which is not limited herein.

Specifically, determining the cell cluster uplink power control adjustment parameter for the first cell cluster based on the gradient of the load function may be implemented as: determining at least one candidate average uplink load based on the gradient of the load function, where the at least one candidate average uplink load is the average uplink load corresponding to a minimum value point of the load function; determining the smallest one of the at least one candidate average uplink load as an estimated average uplink load in the first cell cluster after adjustment; determining the cell cluster uplink power control parameter corresponding to the estimated average uplink load after adjustment as the cell cluster uplink power control adjustment parameter for the first cell cluster. The load function is the function of the average uplink load of the first cell cluster with respect to the cell cluster uplink power control parameter for the first cell cluster.

Optionally, as an embodiment, determining at least one candidate average uplink load based on the gradient of the load function may be implemented as: obtaining at least one minimum value point when the gradient of the load function is zero; and determining the average uplink load corresponding to one of the at least one minimum value as one of the at least one candidate average uplink load.

According to embodiment A of the disclosure, the coordinator may solve Equation(9) based on Equation(10)-Equation(15), and obtain an extreme value point when the gradient of the load function of the first cell cluster is zero. The first cell cluster is one of the cell clusters to be adjusted by the coordinator, the extreme value point represents the extreme value point on the load curve of load function Φ(x), and there are generally a plurality of extreme value points for the load function. The series of extreme value points may include the maximum value and the minimum value, and apparently, a smallest value may only be less than or equal to the smallest minimum value, or in other words, even if the smallest minimum value is not the smallest value, it must be the extreme value point nearest to the smallest value. Thus, the coordinator may get the average uplink loads corresponding to the extreme value points respectively, then choose the extreme value point with the smallest average uplink load, and determine the uplink power control parameter corresponding to the extreme value point with the smallest average uplink load as the uplink power control adjustment parameter for the first cell cluster.

Optionally, as another embodiment, determining at least one candidate average uplink load based on the gradient of the load function may be implemented as: choosing at least one cell cluster uplink power control parameter for the first cell cluster at random or based on a predetermined strategy; determining, based on negative gradient curve of the gradient, an average uplink load corresponding to a minimum value point, to which one of the at least one cell cluster uplink power control parameter converges on the load function, as the at least one candidate average uplink load.

According to embodiment B of the disclosure, the coordinator may choose at least one cell cluster uplink power control parameter for the first cell cluster at random, or the coordinator may alternatively choose at least one cell cluster uplink power control parameter for the first cell cluster based on a predetermined strategy. A cell cluster uplink power control parameter for the first cell cluster is a vector consisting of one uplink power control parameter of each cell in the first cell cluster. Based on Equation(9)-Equation (15), the coordinator may obtain through the negative gradient curve of the load function the function values to which respective cell cluster uplink power control parameters converges on the load function. Apparently, all the convergent function values corresponding to the respective cell cluster uplink power control parameters are minimum values. The coordinator may get the average uplink load corresponding to the extreme value points respectively, then choose the extreme value point with the smallest average uplink load, and determine the uplink power control parameter corresponding to the extreme value point with the smallest average uplink load as the uplink power control adjustment parameter for the first cell cluster.

Optionally, as another embodiment, determining at least one candidate average uplink load based on the gradient of the load function may include: after determining at least one candidate average uplink load for the first cell cluster based on the gradient of the load function, choosing a first candidate average uplink load from the at least one candidate average uplink load, randomly shifting the first candidate average uplink load on the curve corresponding to the load function to obtain a shifted uplink power control parameter for the first cell cluster; determining, based on negative gradient curve of the gradient equation, the average uplink load corresponding to the minimum value point to which the shifted uplink power control parameter converges on the load function as the candidate average uplink load.

According to embodiment C of the disclosure, after determining one or more candidate average uplink loads, the coordinator may choose one, supposing a first candidate average uplink load, from the one or more candidate average uplink loads. The first candidate average uplink load is shifted randomly on the curve corresponding to the load function Φ(x), in order to obtain a shifted uplink power control parameter corresponding to the first candidate average uplink load. For example, a shift to the right by a distance Δx is performed on a curve with Φ as a vertical coordinate and x as a horizontal coordinate, the horizontal coordinate x+Δx is the shifted uplink power control parameter, the vertical coordinate Φ+ΔΦ of the corresponding point on the curve is the average uplink load corresponding to x+Δx. Based on Equation(9)-Equation(15), the coordinator may obtain through the negative gradient curve of the load function Φ(x) the function value to which the shifted uplink power control parameter x+Δx converges on the load function Φ(x), i.e., the function value to which the coordinate (x+Δx, Φ+ΔΦ) converges on the load function Φ(x) along the negative gradient curve of the load function Φ(x).

Embodiments A, B and C of the disclosure are three methods for obtaining the candidate average uplink load. The methods for obtaining the candidate average uplink load may be used in combination. Of course, there are other methods for obtaining the candidate average uplink load, and the disclosure is not limited in this aspect. Hereinafter, a specific implementation of obtaining the candidate average uplink load according to an embodiment of the disclosure is described.

Input: a set Gk of cells in the first cell cluster, a distribution T(x) of users in corresponding area, and a distribution L(x) of path loss in the area Output: uplink power control parameters $X_{best}=(P_{off}, \alpha)$ corresponding to respective cells in Gk Steps:
1. X=ConstructInitialSolution( );
2. $X_{best}$=LocalSearch(X);
3. $X_{best}$→SearchHistory;
4. while ~stopCondition
   X=Perturbation($X_{best}$, SearchHistory);
5. Xcandidate=LocalSearch(X);
6. $X_{candidate}$→SearchHistory;
7. if AcceptanceCriterion($X_{best}$, $X_{candidate}$, SearchHistory)
   $X_{best}$=$X_{candidate}$;
8. return $X_{best}$;

where function ConstructInitialSolution( ) performs initialization for a searching start-point, most commonly random initialization, in which values within the scope prescribed by a standard are randomly assigned to respective cell uplink power control parameters ($P_{cell\_specific}$, α). For the issue of optimization of the uplink power control parameter to be resolved in this solution, a same parameter setting may be provided for all the cells, and the specific values are generated randomly.

Function LocalSearch(X) performs optimization search with X as the start-point. Multiple methods may be used for the optimization search process, such as interior point approach (Interior Point Approach, IP). The interior point approach may convert an optimization issue with a constraint condition in Equation (8) to an optimization issue without the constraint condition, as shown in Equation (16).

$$\max_{P,\alpha,\lambda}\left(\Phi(\overline{P},\overline{\alpha})+\sum_{i=1}^{N_e}\lambda_{1i}(P_{ei}-P_{ei}^{\%}-\Delta P_{ei})^{-1}+\sum_{j=1}^{N_e}\lambda_{2j}(\alpha_{ej}-\alpha_{ej}^{\%}-\Delta\alpha_{ej})^{-1}\right) \quad (16)$$

where Ne represents the number of cells at the edge of the current cluster. A common method for solving the optimization issue in Equation (16) iteratively is a negative gradient method, i.e., convergence to an optimum point may be achieved most quickly in an opposite direction to the current gradient for each iteration, and at this moment, the negative gradient of Equation (16) may be calculated based on the results of Equation (9)-Equation (15). There are other methods for obtaining the gradient and solving the optimization issue in Equation (8), which are not limited herein.

Function Perturbation($X_{best}$, SearchHistory) performs random perturbation on a current optimum point $X_{best}$ based on SearchHistory. The purpose of perturbation is to avoid the search from getting into a local minimum point. If the current search gets into the local minimum point, it is unable to search for other locations according to a conventional search method. At this moment, if the location of the local minimum point is shifted randomly, the search method is likely to escape from the local minimum point, thus a more optimal location is found.

Function AcceptanceCriterion($X_{best}$, $X_{candidate}$, SearchHistory) compares the current optimum point $X_{candidate}$ with the previous optimum point $X_{best}$ based on SearchHistory, and chooses a better location between $X_{candidate}$ and $X_{best}$, and performs follow-on searches.

stopCondition is a condition for stopping looking for the minimum point.

SearchHistory is to record a search record of all minimum points.

In the embodiments of the disclosure for obtaining the candidate average uplink load, after obtaining the candidate average uplink load, the coordinator may choose a minimum candidate average uplink load from all the candidate average uplink loads as an adjustment target, and the uplink power control parameter corresponding to the minimum candidate average uplink load is the uplink power control adjustment parameter of the coordinator.

In addition, due to different locations of the coordinators, message interactions between the coordinator and the cells may be different.

Figure 4:
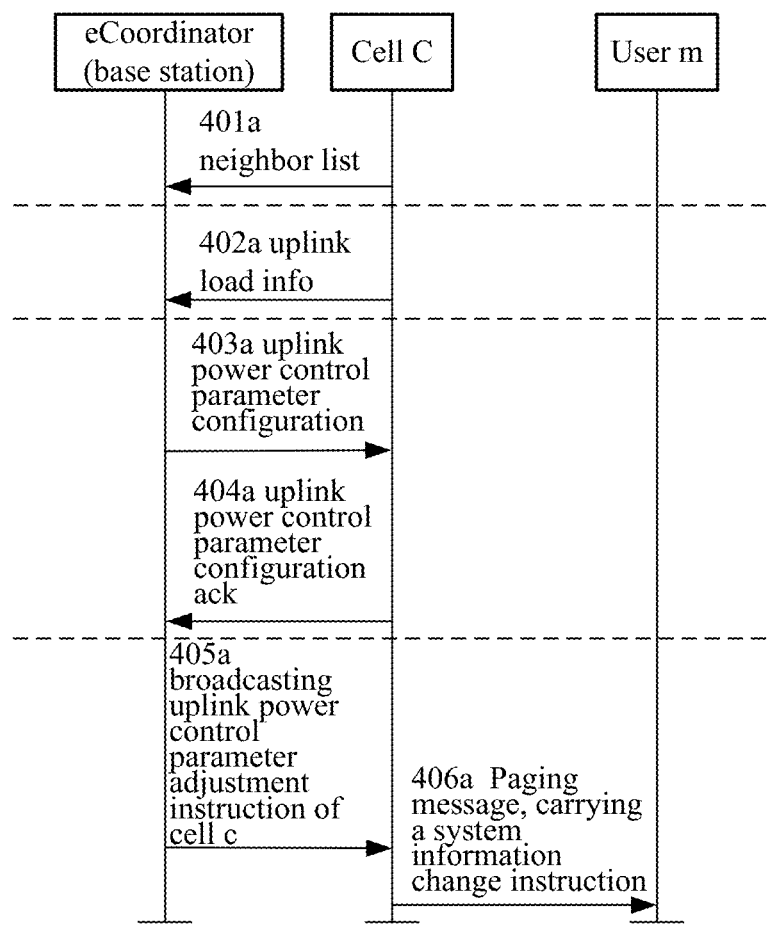
FIG. 4 is a flow chart of interaction in joint optimization of cell clusters according to the embodiment of the disclosure.

FIG. 4 is a flow chart of interaction in joint optimization of cell cluster according to the embodiment of the disclosure. According to the embodiment of the disclosure, the coordinator is deployed in the base station. In addition, though only the flow chart of the interaction between the coordinator and a cell c is shown, the coordinator actually performs message interactions with a plurality of cells similar to cell c belonging to the coordinator.

401a, cell c sends neighbor list information to the coordinator.

Any cell c belonging to the coordinator may send neighbor list information to the coordinator.

For example, the base station to which cell c belongs may send the neighbor list information through an X2-AP eNB configuration update (ENB CONFIGURATION UPDATE) message defined in TS36.423, and the message may include the neighbor list information of cell c.

402a, cell c sends uplink load information to the coordinator.

For the specific method for obtaining uplink load information by cell c, Equation (1)-Equation (6) may be referred to. The uplink load information may be obtained based on the transmission power of a user in cell c, the path loss from the user in cell c to the cell and bandwidth required for the user in cell c, which is not described herein.

For example, the base station to which cell c belongs may send the uplink load information through an X2-AP message RESOURCE STATUS UPDATE defined in TS36.423, and the message may carry the uplink load information (RB utilization rate) of the base station.

403a, the coordinator sends an uplink power control parameter configuration request to cell c.

After clustering the cells, the coordinator may obtain clustering information of the cell cluster first. Specifically, cell identifier list of each cluster may include the identifiers of all cells (including cells in the center and at the edge) in the cluster. After the uplink power control parameter configuration of the cell cluster is obtained through calculation, the coordinator sends updated uplink power control parameter value to respective cells in the cell cluster. For example, the configuration update message received by cell c includes the new uplink power control parameter configuration of cell c, specifically includes the cell-level uplink power control parameters $P_{cell\_specific}$ and $\alpha$. After receiving the new configuration, cell c needs to update the local parameter configuration and a corresponding system information field. The system information field may include: a) the cell-level uplink power control parameters $P_{cell\_specific}$ and $\alpha$ in a SIB type2 message; b) a field systemInfoValueTag in the SIB type1 message.

For example, the base station may send the uplink load information of cell c through a newly defined X2-AP message, i.e., uplink power control setting change request (UPLINK POWER CONTROL SETTING CHANGE REQUEST) message. The uplink power control setting change request message may carry parameters $P_{cell\_specific}$ and $\alpha$ which the coordinator instructs the base station to update. Table 1 is a table structure diagram of the uplink power control setting change request message.

TABLE 1

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| Message Type | M, represents a mandatory item | | | | YES, represents that the whole is considered as diagnostic information | Reject, represents that the process is rejected if a fault occurred |
| eNB1 Cell ID | M | | ECGI | | YES | Reject |
| eNB2 Cell ID | M | | ECGI | | YES | Reject |
| eNB1 Uplink Power Control Parameters | O, represents an optional item | | Uplink Power Control Parameters Information (Uplink Power Control Parameters Information) | | YES | Ignore, represents an ignorable item |
| >PUSCH setting >> p0-NominalPUSCH >> alpha | O | | PUSCH setting INTEGER (−126 . . . 24) ENUMERATED {al0, al04, al05, al06, al07, al08, al09, al1} | | | |
| >PUCCH setting >> p0-NominalPUCCH >> deltaFList-PUCCH | O | | PUCCH setting INTEGER (−127 . . . −96) | | | |
| eNB2 Proposed Uplink Power Control Parameters | M | | Uplink Power Control Parameters Information (Uplink Power Control | target parameter setting in eNB₂ cell (Proposed configuration | YES | Reject |

TABLE 1-continued

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| | | | Parameters Information) | change in eNB$_2$ cell) | | |
| >PUSCH setting | O | | | | | |
| >> p0-NominalPUSCH | | | INTEGER (−126 . . . 24) | | | |
| >> alpha | | | ENUMERATED {al0, al04, al05, al06, al07, al08, al09, al1} | | | |
| >PUCCH setting | O | | | | | |
| >> p0-NominalPUCCH | | | INTEGER (−127 . . . −96) | | | |
| >> deltaFList-PUCCH | | | | | | |
| >> deltaPre-ambleMsg3 | | | INTEGER (−1 . . . 6) | | | |
| Cause | M | | | | YES | Reject |

404a, cell c sends an uplink power control parameter adjustment acknowledgment message to the coordinator.

Cell c adjusts the uplink power control parameter of cell c based on the message carrying uplink power control adjustment parameter sent by the coordinator. After the adjustment, cell c needs to feedback an acknowledgment message to the coordinator.

For example, cell c may define a new X2-AP message, i.e., uplink power control setting change acknowledge (UP-LINK POWER CONTROL CHANGE ACKNOWLEDGE) message to send the acknowledgment message, and Table 2 is a table structure diagram of the uplink power control setting change acknowledge message.

TABLE 2

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| Message Type | M | | | | YES | Reject, represents that the process is rejected if a fault occurred |
| eNB1 Cell ID | M | | ECGI | | YES | Reject |
| eNB2 Cell ID | M | | ECGI | | YES | Reject |
| Criticality Diagnostics | O | | | | YES | Ignore, represents an ignorable item |

405a, the coordinator broadcasts the uplink common parameter configuration of cell c.

The coordinator sends a broadcast instruction (broadcastUlpcSettingChange) message for updating system information to the cells belonging to the base station controlled by the coordinator, and the broadcast instruction message is used to instruct the cells to notify the users in the cells through a Paging process, to update the system information. According to the embodiment, the system information is the uplink power control parameters $P_{cell\_specific}$ and α.

406a, cell c sends a Paging message to user m in the cell.

Cell c notifies, through a flow for updating cell system information, all users in the cell to read the updated cell-level uplink power control parameters $P_{cell\_specific}$ and α.

The uplink power control parameters $P_{cell\_specific}$ and α are a type of system configuration information, and are sent to a terminal through specific system information. System information of the LTE system is sent through two types of messages: MasterInformationBlock (MIB) and SystemInformationBlocks (SIB). MIB includes fundamental information of the system (bandwidth, PHICH channel configuration and system frame number); and with respect to SIB, 13 types of SIBs, named as SIB types 1~13 respectively, are defined in R10 based on different functions, where SIB type1 includes dispatch information of other SIBs. MIB and SIB type1 are fundamental system messages, thus are mapped to BCH, and are sent at a fixed period. SIB types 2~13 are mapped to DL-SCH, and SIB type1 designates the dispatch information of respective types of SIBs. SIB type2~13 are also sent periodically, and the period may be designated by the system and be indicated in SIB type1. A message path for the uplink power control parameters $P_{cell\_specific}$ and α is: SystemInformationBlockType2\RadioResourceConfigCommonSIB\UplinkPowerControl-Common.

For example, cell c may send the Paging message with set systemInfoModification field to all users m in the cell after receiving the broadcast update notification message, to notify users m to read the updated uplink power control parameter. The user m who does not receive the Paging message may initiatively inquire systemInfoValueTag in the SIB type1 message during a current Modification Period, finds out that the uplink power control parameter is updated, and reads the updated parameter value during the next Modification Period.

Figure 5:
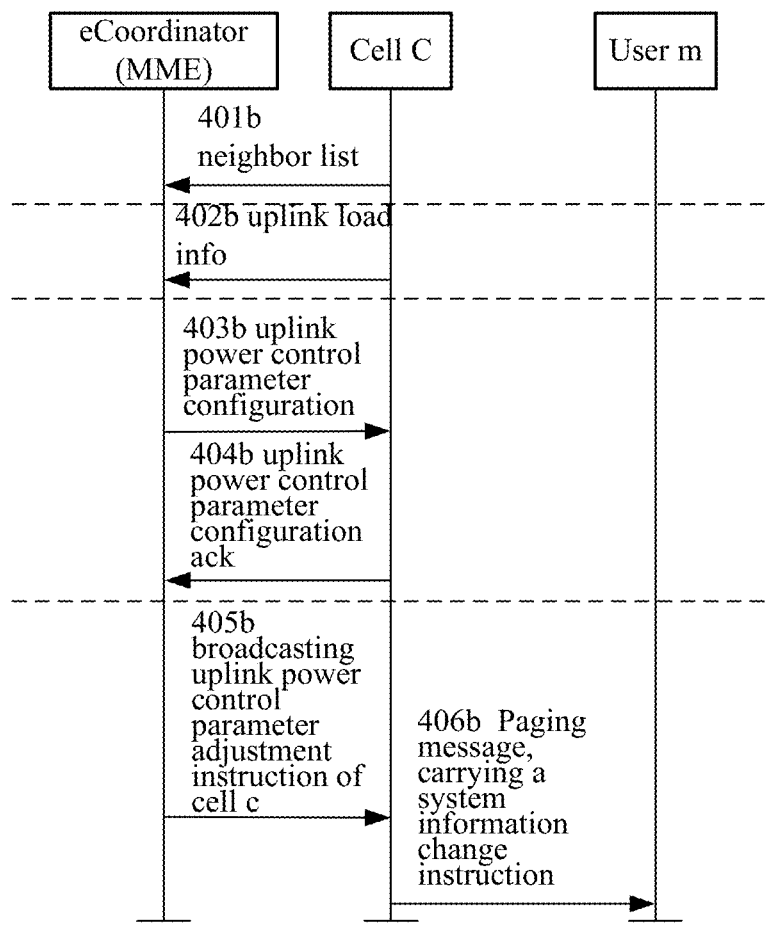
FIG. 5 is another flow chart of interaction in joint optimization of cell clusters according to the embodiment of the disclosure.

FIG. 5 is another flow chart of interaction in joint optimization of cell clusters according to the embodiment of the disclosure. According to the embodiment of the disclosure, the coordinator is deployed in a mobility management entity (Mobility Management Entity, MME). In addition, though only the flow chart of the interaction between the coordinator and cell c is shown, the coordinator actually performs message interactions with a plurality of cells similar to cell c that belong to the coordinator.

401b, cell c sends neighbor list information to the coordinator.

Any cell c belonging to the coordinator may send the neighbor list information to the coordinator.

For example, the base station to which cell c belongs may send the neighbor list information through an S1-AP message, i.e., eNB configuration update (ENB CONFIGURATION UPDATE) message defined in TS 36.413, and the message may include the neighbor list information of cell c. The table structure of the base station configuration update message may be shown as Table 3.

TABLE 3

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| Message Type | M, represents a mandatory item | | | | YES, represents that the whole is considered as diagnostic information | Reject, represents that the process is rejected if a fault occurred |
| eNB Name (eNB Name) | O, represents an optional item | | Printable String (1 . . . 150, . . .) | | YES | Ignore, represents that the item is ignored if a fault occurred |
| >TAC | M | | | Broadcasted TAC (Broadcasted TAC) | — | |
| >Broadcast PLMNs | | 1 . . . <maxnoofBPLMNs> | | Broadcasted PLMN (Broadcasted PLMNs) | — | |
| >>PLMN Identity | M | | | | — | |
| CSG Id List | | 0 . . . 1 | | | GLOBAL | Reject |
| >CSG Id | | 1 to <maxnoofCSGId> | | | — | |
| Default paging DRX | O | | | | YES | Ignore |
| Neighbour Information | | 0 . . . <maxnoofNeighbours> | | | — | — |
| >ECGI | M | | ECGI | E-UTRAN Cell Global Identifier of the neighbour cell (E-UTRAN Cell Global Identifier of the neighbour cell) | — | — |

TABLE 3-continued

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| >PCI | M | | INTEGER (0 . . . 503, . . .) | Physical Cell Identifier of the neighbour cell (Physical Cell Identifier of the neighbour cell) | — | — |
| >EARFCN | M | | | DL EARFCN for FDD or EARFCN for TDD (DL EARFCN for FDD and EARFCN for TDD) | — | — |
| >TAC | O | | OCTET STRING (2) | Tracking Area Code (Tracking Area Code) | YES | Ignore |

In Table 3, fields after the field Neighbour Information (including the field Neighbour Information) are newly added.

402b, cell c sends uplink load information to the coordinator.

For the specific method for obtaining uplink load information by cell c, Equation (1)-Equation (6) may be referred to. The uplink load information may be obtained based on the transmission power of a user in cell c, the path loss from the user in cell c to the cell and the bandwidth required for the user in cell c, which is not described herein.

For example, the base station to which cell c belongs may send the uplink load information through the S1-AP message, i.e., eNB direct information transfer (eNB DIRECT INFORMATION TRANSFER) message defined in TS 36.423, and the message may carry the uplink load information of the base station. Since the message eNB DIRECT INFORMATION TRANSFER is originally configured to transfer RIM PDU to the eNB in an opposite end, it is defined in TS36.413 that MME does not parse RIM PDU when receiving the message. According to the embodiment of the disclosure, a special identifier may be made in the field eNB DIRECT INFORMATION TRANSFER/RIM/RIM Routing Address which is originally used to be filled with address information of the eNB in the opposite end. Meanwhile, the special identifier is made in a destination address (eNB DIRECT INFORMATION TRANSFER/RIM/RIM Transfer/RIM Information/Destination Cell Identifier) in RIM PDU, such as all zeros or all ones (as shown in Table 4). When the field RIM Routing Address in the received message is the special identifier (as shown in Table 5), MME may parse the RIM PDU of the message to obtain an uplink load measurement report, and thus obtain the uplink load of the cell.

TABLE 4

| Parameter name (IE/Group Name) | Presence condition (Presence) | Parameter range (Range) | Parameter type and related information (IE type and reference) | Semantics description (Semantics description) |
|---|---|---|---|---|
| RIM Transfer | | | | |
| >RIM Information | M, represents a mandatory item | | 9.2.3.24 | |
| >RIM Routing Address | O, represents an optional item | | 9.2.3.25 | If present as special value, e.g., all 1 or 0 sequence, MME shall interpret RIM information. The special value should not be a valid cell identification (If present |

TABLE 4-continued

| Parameter name (IE/Group Name) | Presence condition (Presence) | Parameter range (Range) | Parameter type and related information (IE type and reference) | Semantics description (Semantics description) |
|---|---|---|---|---|
| | | | | as special value, e.g., all 1 or 0 sequence, MME shall interpret RIM information. The special value should not be a valid cell identification.) |

In Table 4, the field>RIM Routing Address is newly added.

TABLE 5

| Parameter name (IE/Group Name) | Presence condition (Presence) | Parameter range (Range) | Parameter type and related information (IE type and reference) | Semantics description (Semantics description) |
|---|---|---|---|---|
| RIM Information | | | | |
| >RIM Information | M, represents a mandatory item | | OCTET STRING | PDU Contains the BSSGP RIM PDU as defined in ref TS 48.018 [18] (PDU Contains the BSSGP RIM PDU as defined in ref TS 48.018 [18].) |
| >> PDU type | M | | | |
| >> Destination Cell Identifier | M | | | If present as special value, e.g., all 1 or 0 sequence, MME shall interpret RIM information. The special value should not be a valid cell identification (If present as special value, e.g., all 1 or 0 sequence, MME shall interpret RIM information. The special value should not be a valid cell identification.) |
| >> Source Cell Identifier | M | | | |
| >> RIM Container | M | | | See TS 48.018 11.3.62a.2 (See TS 48.018 11.3.62a.2) |

In Table 5, the field>>Destination Cell Identifier is newly added.

403b, the coordinator sends an uplink power control parameter configuration request to cell c.

After clustering the cells, the coordinator may obtain the clustering information first. Specifically, each cluster is a cell identifier list including identifiers of all cells (including cells in the center and at the edge) in the cluster. Then, after the new uplink power control parameter configuration is obtained through calculation, the coordinator sends the updated uplink power control parameter value cluster-by-cluster and cell-by-cell. For example, the configuration update message received by cell c includes the new uplink power control parameter configuration of cell c, specifically includes the cell-level uplink power control parameters $P_{cell\_specific}$ and $\alpha$. After receiving the new configuration, cell c needs to update the local parameter configuration and a corresponding system information field. The system information field may include: a) the cell-level uplink power control parameters $P_{cell\_specific}$ and $\alpha$ in the SIB type2 message; b) the field systemInfoValueTag in the SIB type1 message.

For example, MME may send the uplink power control parameter configuration request to cell c through the S1-AP message defined in TS 36.423, i.e., MME configuration transfer (MME CONFIGURATION TRANSFER) message. Content of the message path MME CONFIGURATION TRANSFER/SON Configuration Transfer/SON Information is shown in Table 6.

TABLE 6

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| Message Type | M, represents a mandatory item | | | | YES | Ignore, represents that the item is ignored if a fault occurred |
| SON Configuration Transfer | O, represents an optional item | | | | YES | Ignore |

The content of message path MME CONFIGURATION TRANSFER/SON Configuration Transfer/SON Information is shown in Table 7 (section 9.2.3.27 in TS 36.423).

TABLE 7

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| CHOICE SON Information | | | | | | |
| >SON Information Request | | | | | | |
| >>SON Information Request | | | ENUMERATED (X2 TNL Configuration Info, . . . , Time synchronization Info) | | — | |
| >SON Information Reply | | | | | | |
| >>SON Information Reply | | | | | — | |
| >Cell Settings Change Request | O | | | | | |
| >>Proposed Uplink Power Control Parameters | O | | Uplink Power Control Parameters Information (Uplink Power Control Parameters Information) | Proposed configuration change in eNB$_2$ cell (Proposed configuration change in eNB$_2$ cell) | YES | Reject, represents that the process is rejected if a fault occurred |
| >>>PUSCH setting | O | | | | | |
| >>>> p0-NominalPUSCH | | | INTEGER (−126 . . . 24) | | | |
| >>>> alpha | | | ENUMERATED {al0, al04, al05, al06, al07, al08, al09, al1} | | | |
| >>>PUCCH setting | O | | | | | |

TABLE 7-continued

| Parameter name (IE/Group Name) | Presence condition (Presence) | Parameter range (Range) | Parameter type and related information (IE type and reference) | Semantics description (Semantics description) | diagnostic information after a fault occurred (Criticality) | Importance of parameter (Assigned Criticality) |
|---|---|---|---|---|---|---|
| >>>>p0-NominalPUCCH | | | INTEGER (−127 . . . −96) | | | |
| >>>>deltaFList-PUCCH | | | | | | |
| >>>>deltaPre-ambleMsg3 | | | INTEGER (−1 . . . 6) | | | |

In Table 7, the fields after the field>Cell Settings Change Request (including the field>Cell Settings Change Request) are newly added.

404b, cell c sends an uplink power control parameter adjustment acknowledgment message to the coordinator.

Cell c adjusts its uplink power control parameter based on the message carrying uplink power control adjustment parameter sent by the coordinator. After the adjustment, cell c needs to feedback an acknowledgment message to the coordinator.

405b, the coordinator broadcasts the uplink common parameter configuration of cell c.

The coordinator sends a broadcast instruction (broadcastUlpcSettingChange) message for updating system information to the cells belonging to the base station controlled by the coordinator, and the broadcast instruction message is used to instruct the cells to notify the users in the cells through a Paging process, to update the system information. According to the embodiment, the system information is the uplink power control parameters $P_{cell\_specific}$ and $\alpha$.

406b, cell c sends a Paging message to user m in the cell.

Cell c notifies, through a flow for updating cell system information, all users in the cell to read the updated cell-level uplink power control parameters $P_{cell\_specific}$ and $\alpha$.

The uplink power control parameters $P_{cell\_specific}$ and $\alpha$ are a type of system configuration information, and are sent to a terminal through specific system information. System information of the LTE system is sent through two types of messages: MasterInformationBlock (MIB) and SystemInformationBlocks (SIB). MIB includes fundamental information of the system (bandwidth, PHICH channel configuration and system frame number); and with respect to SIB, 13 types of SIBs, named as SIB types 1~13 respectively, are defined in R10 based on different functions, where SIB type1 includes dispatch information of other SIBs. MIB and SIB type1 are fundamental system messages, thus are mapped to BCH, and are sent at a fixed period. SIB types 2~13 are mapped to DL-SCH, and SIB type1 designates the dispatch information of respective types of SIBs. SIB types 2~13 are also sent periodically, and the period may be designated by the system and indicated in SIB type1. A message path for the uplink power control parameters $P_{cell\_specific}$ and $\alpha$ is: SystemInformationBlockType2\RadioResourceConfigCommonSIB\UplinkPowerControlCommon.

For example, cell c may send the Paging message with set systemInfoModification field to all users m in the cell after receiving the broadcast update notification message, to notify users m to read the updated uplink power control parameter. The user m who does not receive the Paging message may initiatively inquire systemInfoValueTag in the SIB type1 message during a current Modification Period, finds out that the uplink power control parameter is updated, and reads the updated parameter value during the next Modification Period.

Figure 6:
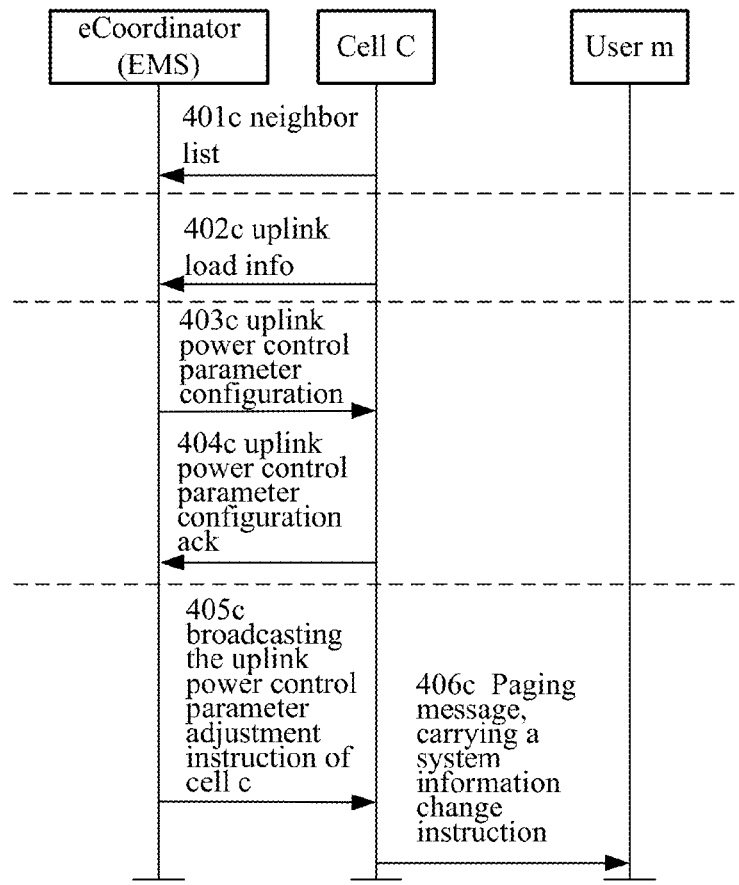
FIG. 6 is yet another flow chart of interaction in joint optimization of cell clusters according to the embodiment of the disclosure.

FIG. 6 is another flow chart of interaction in joint optimization of cell clusters according to the embodiment of the disclosure. According to the embodiment of the disclosure, the coordinator is deployed in a separate element management system (Element Management System, EMS) entity. In addition, though only the flow chart of the interaction between the coordinator and cell c is shown, the coordinator actually performs message interactions with a plurality of cells similar to cell c belonging to the coordinator.

401c, cell c sends neighbor list information to the coordinator.

For example, the base station to which cell c belongs may send the neighbor list (neighborList) information to the coordinator, and the information may include neighbor identifiers of all cells belonging to the base station. In this case, the base station to which cell c belongs may transfer information to the coordinator without a standard interface.

402c, cell c sends uplink load information to the coordinator.

For the specific method for obtaining uplink load information by cell c, Equation (1)-Equation (6) may be referred to. The uplink load information may be obtained based on the transmission power of a user in cell c, the path loss from the user in cell c to the cell and the bandwidth required for the user in cell c, which is not described herein.

For example, the base station to which cell c belongs may send uplink load (UpLinkLoad) information to the coordinator, and the uplink load information may include uplink load statistics in the current statistical period.

403c, the coordinator sends an uplink power control parameter setting request to cell c.

After clustering the cells, the coordinator may obtain the clustering information first. Specifically, each cluster is a cell identifier list including identifiers of all cells (including cells in the center and at the edge) in the cluster. Then, after the new uplink power control parameter configuration is obtained through calculation, the coordinator sends the updated uplink power control parameter value cluster-by-cluster and cell-by-cell. For example, the configuration update message received by cell c includes the new uplink power control parameter configuration of cell c, specifically includes the cell-level uplink power control parameters $P_{cell\_specific}$ and $\alpha$. After receiving the new configuration, cell c needs to update the local parameter configuration and a corresponding system information field. The system information field may include: a) the cell-level uplink power control parameters $P_{cell\_specific}$ and $\alpha$ in the SIB type2 message; b) the field systemInfoValueTag in the SIB type1 message.

404c, cell c sends an uplink power control parameter adjustment acknowledgment message to the coordinator.

Cell c adjusts its uplink power control parameter based on the message carrying uplink power control adjustment parameter sent by the coordinator. After the adjustment, cell c needs to feedback an acknowledgment message to the coordinator.

405c, the coordinator broadcasts the uplink common parameter configuration of cell c.

The coordinator sends a broadcast instruction (broadcastUlpcSettingChange) message for updating system information to the cells belonging to the base station controlled by the coordinator, and the broadcast instruction message is used to instruct the cells to notify the users in the cells through a Paging process, to update the system information. According to the embodiment, the system information is the uplink power control parameters $P_{cell\_specific}$ and $\alpha$.

406c, cell c sends a Paging message to user m in the cell.

Cell c notifies, through a flow for updating cell system information, all users in the cell to read the updated cell-level uplink power control parameters $P_{cell\_specific}$ and $\alpha$.

The uplink power control parameters $P_{cell\_specific}$ and $\alpha$ are a type of system configuration information, and are sent to a terminal through specific system information. System information of the LTE system is sent through two types of messages: MasterInformationBlock (MIB) and SystemInformationBlocks (SIB). MIB includes fundamental information of the system (bandwidth, PHICH channel configuration and system frame number); and with respect to SIB, 13 types of SIBs, named as SIB types 1~13 respectively, are defined in R10 based on different functions, where SIB type1 includes dispatch information of other SIBs. MIB and SIB type1 are fundamental system messages, thus are mapped to BCH, and are sent at a fixed period. SIB types 2~13 are mapped to DL-SCH, and SIB type1 designates the dispatch information of respective types of SIBs. SIB types 2~13 are also sent periodically, and the period may be designated by the system and indicated in SIB type1. A message path for the uplink power control parameters $P_{cell\_specific}$ and $\alpha$ is: SystemInformationBlockType2\RadioResourceConfigCommonSIB\UplinkPowerControl-Common.

For example, cell c may send the Paging message with set systemInfoModification field to all users m in the cell after receiving the broadcast update notification message, to notify users m to read the updated uplink power control parameter. The user m who does not receive the Paging message may initiatively inquire systemInfoValueTag in the SIB type1 message during a current Modification Period, finds out that the uplink power control parameter is updated, and reads the updated parameter value during the next Modification Period.

The manners for transferring information such as neighbor list and uplink power control parameter configuration are not limited to message formats shown in FIG. 4-FIG. 6 according to the embodiments, and the disclosure is not limited in this aspect.

In addition, the coordinator may be deployed in a network element such as gateway and controller.

Figure 7:
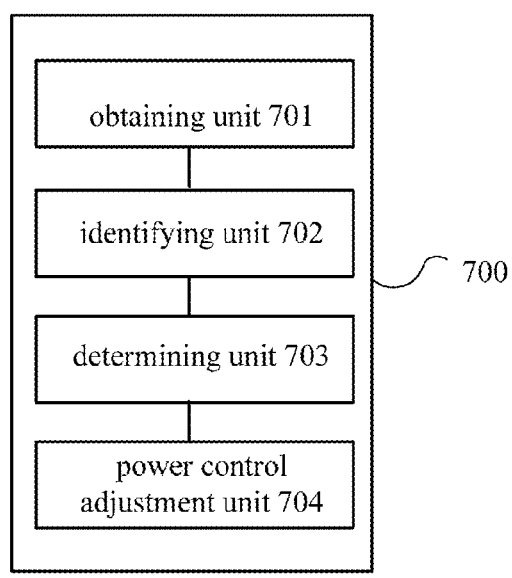
FIG. 7 is a structural diagram of a coordinator device according to the embodiment of the disclosure.

FIG. 7 is a structural diagram of a coordinator device 700 according to the embodiment of the disclosure. The coordinator device 700 may include an obtaining unit 701, an identifying unit 702, a determining unit 703 and a power control adjustment unit 704.

The obtaining unit 701 may obtain uplink load information of a plurality of cells.

The identifying unit 702 may identify cells of a first type and cells of a second type in the plurality of cells. The uplink load of the cell of the first type is greater than a predetermined threshold, and the uplink load of the cell of the second type is less than or equal to a predetermined threshold.

The determining unit 703 may determine at least one cell cluster based on the cells of the first type, the cells of the second type and a neighbor relationship of the multiple cells. Any cell cluster among the at least one cell cluster includes at least one of the cell of the first type and cell(s) of the first type or the second type adjacent to the at least one cell of the first type.

The power control adjustment unit 704 may perform joint optimization of the uplink power control parameter on each cell cluster in the at least one cell cluster.

According to the embodiment, the coordinator device 700 distinguishes an overloaded cell based on the uplink load information of the plurality of cells, and classifies the overloaded cell and underloaded cell(s) adjacent to the overloaded cell into a cell cluster, for the joint optimization of the uplink power control parameter, thus uplink interference in the cell cluster is effectively coordinated, and a load imbalance is avoided.

Optionally, according to the embodiment, the coordinator device 700 may be deployed in a base station, MME, gateway, controller or independent EMS.

Optionally, the obtaining unit 701 may further obtain a neighbor relationship of the plurality of cells.

Optionally, as an embodiment, the cell cluster determined by the determining unit 703 includes one cell of the first type.

Optionally, as another embodiment, any cell of the first type in the cell cluster determined by the determining unit 703 is spaced from the nearest cell of the first type by at most one cell of the second type.

Specifically, the determining unit 703 may determine one cell of the first type as a member of the cell cluster, determine a cell of the first type or a cell of the second type, which is adjacent to the cell of the first type in the cell cluster, as the member of the cell cluster, and determine a cell of the first type which is adjacent to the cell of the second type in the cell cluster as the member of the cell cluster.

Specifically, the power control adjustment unit 704 may determine the uplink power control adjustment parameters of respective cells in a first cell cluster among the at least one cell cluster, and send the uplink power control adjustment parameters of respective cells to the respective cells in the first cell cluster, for the respective cells to perform uplink power control adjustment.

Further, the power control adjustment unit 704 may determine the power control adjustment parameter of the first cell cluster based on a gradient of a load function, where the load function is the function of an average uplink load of the first cell cluster with respect to the uplink power control parameter of the first cell cluster, and the gradient is a partial derivative of the load function with respect to the uplink power control parameter of the first cell cluster.

Further, the power control adjustment unit 704 may include a first determining subunit, a second determining subunit and a third determining subunit. The first determining subunit may determine at least one candidate average uplink load based on the gradient of the load function, where the at least one candidate average uplink load is the average uplink load corresponding to a minimum value point of the load function. The second determining subunit may determine the smallest one of the at least one candidate average uplink load as an estimated average uplink load in the first cell cluster after adjustment. The third determining subunit may determine the uplink power control parameter corresponding to the estimated average uplink load after adjustment as the uplink power control adjustment parameter for the first cell cluster.

Optionally, as an embodiment, the first determining subunit is configured to obtain at least one extreme value point when the gradient of the load function is zero, and determine an average uplink load corresponding to one of the at least one extreme value point as one of the at least one candidate average uplink load.

Optionally, as another embodiment, the first determining subunit is configured to choose at least one group of uplink power control adjustment parameters of the first cell cluster at random or based on a predetermined strategy, and determine, based on negative gradient curve of the gradient, an average uplink load corresponding to a minimum value point, to which one among the at least one group of first uplink power control parameters converges on the load function, as one of the at least one candidate average uplink load, where the one among the at least one group of uplink power control adjustment parameters includes one uplink power control adjustment parameter of each cell in the cell cluster.

Optionally, as another embodiment, the first determining subunit is configured to randomly shift one of the at least one candidate average uplink load on the curve corresponding to the load function, to obtain a shifted uplink power control parameter of the first cell cluster, and determine, based on negative gradient curve of the gradient equation, an average uplink load corresponding to a minimum value point to which the shifted uplink power control parameter converges on the load function as the candidate average uplink load.

In addition, the coordinator device 700 may further execute the methods shown in FIG. 1 and FIG. 2, and implement the functions of the coordinator according to the embodiments shown in FIG. 4, FIG. 5 and FIG. 6, which are not described herein.

Figure 8:
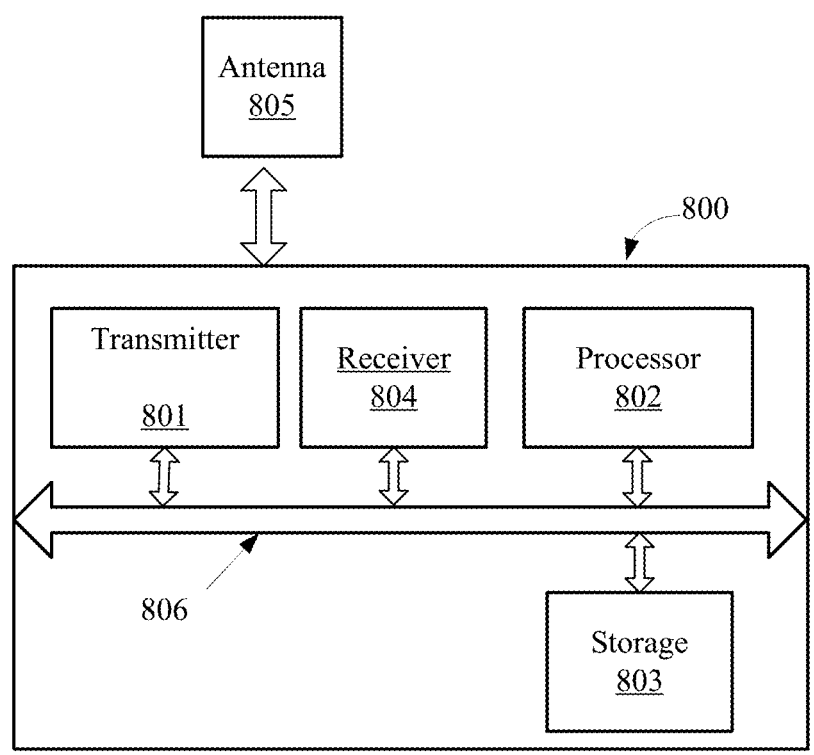
FIG. 8 is another structural diagram of the coordinator device according to the embodiment of the disclosure.

FIG. 8 is a structural diagram of the coordinator device 800 according to the embodiment of the disclosure. The coordinator device 800 may include a receiver 804, a transmitter 801, a processor 802 and storage 803.

The receiver 804 may obtain uplink load information of a plurality of cells.

The processor 802 may identify cells of a first type and cells of a second type in the plurality of cells, determine at least one cell cluster based on the cells of the first type, the cells of the second type and a neighbor relationship of the plurality of cells, and perform joint optimization of uplink power control parameter on each cell cluster in the at least one cell cluster through the transmitter 801.

An uplink load of the cell of the first type is greater than a predetermined threshold, the uplink load of the cell of the second type is less than or equal to the predetermined threshold, and any cell cluster among the at least one cell cluster includes at least one cell of the first type and cell(s) of the first type or the second type adjacent to the at least one cell of the first type.

The storage 803 may store instructions that allow the processor 802 to identify cells of a first type and cells of a second type in the plurality of cells, to determine at least one cell cluster based on the cells of the first type, the cells of the second type and a neighbor relationship of the plurality of cells, and to perform joint optimization of uplink power control parameter on each cell cluster in the at least one cell cluster through the transmitter 801.

According to the embodiment, the coordinator device 800 distinguishes an overloaded cell based on the uplink load information of the plurality of cells, and classifies the overloaded cell and underloaded cell(s) adjacent to the overloaded cell into a cell cluster, for the joint optimization of the uplink power control parameter, thus uplink interference in the cell cluster is effectively coordinated, and a load imbalance is avoided.

In addition, the coordinator device 800 may further include a transmitter 801, a receiver 804, and so on. The processor 802 controls operations of the coordinator device 800, and may be called as CPU (Central Processing Unit, CPU). The storage 803 may include read-only memory and random access memory, and provide instructions and data to the processor 802. A part of the storage 803 may further include non volatile random access memory (NVRAM). In a specific application, the transmitter 801 and the receiver 804 may be coupled to an antenna 805. Respective components of the coordinator device 800 are coupled together through a bus system 806, where besides a data bus, the bus system 806 may further include a power bus, a control bus, a status signal bus, and so on. For clarity, all kinds of buses are marked as the bus system 806 in the drawings.

The method according to the embodiments of the disclosure may be applied to the processor 802, or be implemented by the processor 802. The processor 802 may be an integrated circuit chip with signal processing capability. In the implementation, the steps of the method may be accomplished through integrated logic circuits in the form of hardware or instructions in the form of software. The processor 802 may be a general purpose processor, digital signal processor (DSP), application-specific integrated circuit (ASIC), field-programmable gate array (FPGA) or another programmable logic device, discrete gate or transistor logic device, and discrete hardware component, and may implement and execute the methods, steps and logic diagrams according to the embodiments. The general purpose processor may be a microprocessor or any conventional processor, etc. The steps of the method according to the embodiments may be directly executed through a hardware decode processor, or executed through a combination of the hardware and software in the decode processor. A software module may be located in a fully developed storage medium in the field such as random access memory, flash memory, read-only memory, programmable read only memory or electrically erasable programmable memory, and register. The storage medium is located in the storage 803, the processor 802 reads the information in the storage 803 and accomplishes the steps of the method in conjunction with the hardware.

Optionally, according to the embodiment, the coordinator device 800 may be deployed in a base station, MME, gateway, controller or independent EMS.

Optionally, the receiver 804 may further obtain a neighbor relationship of the plurality of cells.

Optionally, as an embodiment, the cell cluster determined by the processor 802 includes one cell of the first type.

Optionally, as another embodiment, any cell of the first type in the cell cluster determined by the processor 802 is spaced from the nearest cell of the first type by at most one cell of the second type.

Specifically, the processor 802 may determine one cell of the first type as a member of the cell cluster, determine a cell of the first type or the second type, which is adjacent to the cell of the first type in the cell cluster, as the member of the cell cluster, and determine a cell of the first type which is adjacent to a cell of the second type in the cell cluster as the member of the cell cluster.

Specifically, the processor 802 may determine the uplink power control adjustment parameters of respective cells in a first cell cluster among the at least one cell cluster, and send the uplink power control adjustment parameters of respective cells to the respective cells in the first cell cluster through the transmitter 801, for the respective cells to perform uplink power control adjustment.

Further, the processor 802 may determine the power control adjustment parameter of the first cell cluster based on a gradient of a load function, where the load function is the function of an average uplink load of the first cell cluster with respect to the uplink power control parameter of the first cell cluster, and the gradient is a partial derivative of the load function with respect to the uplink power control parameter of the first cell cluster.

Further, the processor 802 may determine at least one candidate average uplink load based on the gradient of the load function, determine the smallest one of the at least one candidate average uplink load as an estimated average uplink load in the first cell cluster after adjustment, and determine the uplink power control parameter corresponding to the estimated average uplink load after adjustment as the uplink power control adjustment parameter of the first cell cluster. The at least one candidate average uplink load is the average uplink load corresponding to a minimum value point of the load function.

Optionally, as an embodiment, determining, by the processor 802, a smallest one among the at least one candidate average uplink load as an estimated average uplink load after adjustment of the first cell cluster may include: obtaining at least one extreme value point when the gradient of the load function is zero, and determining an average uplink load corresponding to one of the at least one extreme value point as one of the at least one candidate average uplink load.

Optionally, as another embodiment, determining, by the processor 802, a smallest one among the at least one candidate average uplink load as an estimated average uplink load after adjustment of the first cell cluster may include: choosing at least one group of adjusted uplink power control adjustment parameters of the first cell cluster at random or based on a predetermined strategy, and determining, based on negative gradient curve of the gradient, an average uplink load corresponding to a minimum value point, to which one among the at least one group of first uplink power control parameters converges on the load function, as one of the at least one candidate average uplink load, where the one among the at least one group of uplink power control adjustment parameters includes one uplink power control adjustment parameter of each cell in the cell cluster.

Optionally, as another embodiment, determining, by the processor 802, a smallest one among the at least one candidate average uplink load as an estimated average uplink load after adjustment of the first cell cluster may include: randomly shift one of the at least one candidate average uplink load on the curve corresponding to the load function, to obtain a shifted uplink power control parameter of the first cell cluster, and determine, based on negative gradient curve of the gradient equation, an average uplink load corresponding to a minimum value point to which the shifted uplink power control parameter converges on the load function as the candidate average uplink load.

In addition, the coordinator device 800 may further execute the methods shown in FIG. 1 and FIG. 2, and implement the functions of the coordinator according to the embodiments shown in FIG. 4, FIG. 5 and FIG. 6, which are not described herein.

Those skilled in the art may realize that, the unit and algorithm step of the described example according to the embodiments of the disclosure may be implemented through electronic hardware, or combination of computer software and electronic hardware. Whether the function is executed through hardware or software depends on the specific application of the technical solution and a design constraint. Those skilled in the art may implement the described function through different methods for each specific application, and the implementation should not be considered to be beyond the scope of the disclosure.

Those skilled in the art may clearly understand that, for convenience and concision of description, a corresponding process according to the forgoing method embodiment may be referred to in order to know the operation process of the described system, device and unit, which is not described again here.

According to the embodiments of the disclosure, it should be noted that, the described system, device and method, may be implemented through another mode. For example, the described device embodiment is just illustrative; the division of unit is just a type of logical functional division, and there may be another division mode in practical implementation; multiple units or components may be combined or integrated into another system, or some features may be neglected or not executed. In addition, the displayed or discussed mutual coupling, direct coupling or communication connection may be achieved through indirect coupling or communication connection of some interfaces, devices or units, or may be electrical, mechanical, or in another form.

The unit described as a separate part may be or may not be separate physically, and the component displayed as the unit may be or may not be the physical unit, i.e., the component may be located at a place, or may be distributed in multiple network units. Part of or all the units may be chosen based on practical requirement to implement the objective of the embodiment.

In addition, the respective function units according to the embodiments of the disclosure may be integrated into one processing unit, or may exists separately and physically, or two or more units may be integrated into one unit.

If the function is implemented in the form of software function unit and is sold or used as an independent product, the function may be stored in a computer readable storage medium. Based on this understanding, the essential technical solution of the disclosure or the part contributing to the conventional technology or a part of the technical solution may be embodied in the form of software product, and the computer software product is stored in a storage medium, which includes some instructions to allow a computer equipment (may be a personal computer, a server, or a network equipment, etc.) to execute all or part of the steps in the method according to the embodiments of the disclosure. The forgoing storage medium includes various mediums capable of storing a program code such as U-disk, mobile hard disk, read-only memory (ROM, Read-Only Memory), random access memory (RAM, Random Access Memory), disk or compact disk.

The above are only implementation of the invention, and the protection scope of the invention is not limited hereto. Modifications and replacements made within the scope of technology by those skilled in the art fall within the protection scope of the invention. Thus, the protection scope of the invention is subject to the protection scope of the claims.

What is claimed is:

1. A method for controlling uplink power, comprising:
   obtaining, by a coordinator device, uplink load information of a plurality of cells;
   identifying, by the coordinator device, cells of a first type and cells of a second type in the plurality of cells, wherein an uplink load of a cell of the first type is greater than a predetermined threshold, and an uplink load of a cell of the second type is less than or equal to the predetermined threshold;
   determining, by the coordinator device, at least one cell cluster based on the cells of the first type, the cells of the second type and a neighbor relationship of the plurality of cells, wherein each cell cluster of the at least one cell cluster includes: at least one cell of the first type and at least one cell of the first type or the second type adjacent to the at least one cell of the first type; and
   performing, by the coordinator device, joint optimization of an uplink power control parameter on each cell cluster of the at least one cell cluster.

2. The method according to claim 1, wherein any cell of the first type in each cell cluster of the at least one cell cluster is spaced from any nearest cell of the first type by at most one cell of the second type.

3. The method according to claim 1, wherein determining the at least one cell cluster further comprises:
   determining one first cell of the first type as a member of the cell cluster;
   determining a second cell of the first type or a second cell of the second type, which is adjacent to the first cell of the first type in the cell cluster, as a member of the cell cluster; and
   determining a third cell of the first type, which is adjacent to a third cell of the second type in the cell cluster, as a member of the cell cluster.

4. The method according to claim 1, further comprising:
   obtaining the neighbor relationship of the plurality of cells.

5. The method according to claim 1, wherein performing the joint optimization further comprises:
   determining uplink power control adjustment parameters of cells in a first cell cluster of the at least one cell cluster; and
   sending the determined uplink power control adjustment parameters to the cells in the first cell cluster, for the cells in the first cell cluster to perform uplink power control adjustment.

6. The method according to claim 5, wherein determining the uplink power control adjustment parameters further comprises:
   determining a cell cluster uplink power control adjustment parameter of the first cell cluster based on a gradient of a load function, wherein the load function is a function of an average uplink load of the first cell cluster with respect to the uplink power control parameter of the first cell cluster, wherein the gradient is a partial derivative of the load function with respect to a cell cluster uplink power control parameter of the first cell cluster, wherein the cell cluster uplink power control parameter of the first cell cluster is a vector comprising uplink power control parameters of respective cells in the first cell cluster, and wherein the cell cluster uplink power control adjustment parameter of the first cell cluster is an adjusted cell cluster uplink power control parameter of the first cell cluster.

7. The method according to claim 6, wherein determining the cell cluster uplink power control adjustment parameter of the first cell cluster further comprises:
   determining at least one candidate average uplink load based on the gradient of the load function, wherein the at least one candidate average uplink load is an average uplink load corresponding to a minimum value point of the load function;
   determining a smallest one of the at least one candidate average uplink load as an estimated average uplink load after adjustment of the first cell cluster; and
   determining the cell cluster uplink power control parameter corresponding to the estimated average uplink load after adjustment as the cell cluster uplink power control adjustment parameter of the first cell cluster.

8. The method according to claim 7, wherein determining the at least one candidate average uplink load further comprises:
   obtaining at least one extreme value point when the gradient of the load function is zero; and
   determining the average uplink load corresponding to one of the at least one extreme value point as one of the at least one candidate average uplink load.

9. The method according to claim 7, wherein determining the at least one candidate average uplink load further comprises:
   choosing at least one cell cluster uplink power control parameter of the first cell cluster at random or based on a predetermined strategy; and
   determining, based on negative gradient curve of the gradient, an average uplink load corresponding to a minimum value point, to which one of the at least one cell cluster uplink power control parameter converges on the load function, as the at least one candidate average uplink load.

10. The method according to claim 7, wherein determining the at least one candidate average uplink load further comprises:
    randomly shifting one of the at least one candidate average uplink load on the curve corresponding to the load function, to obtain a shifted uplink power control parameter of the first cell cluster; and
    determining, based on negative gradient curve of the gradient equation, an average uplink load corresponding to a minimum value point to which the shifted uplink power control parameter converges on the load function as the candidate average uplink load.

11. A coordinator device, comprising:
    a receiver;
    a transmitter; and
    a processor;
    wherein the receiver is configured to obtain uplink load information of a plurality of cells;
    wherein the processor is configured to:
        identify cells of a first type and cells of a second type in the plurality of cells, wherein an uplink load of a cell of the first type is greater than a predetermined threshold, and an uplink load of a cell of the second type is less than or equal to the predetermined threshold;
        determine at least one cell cluster based on the cells of the first type, the cells of the second type and a neighbor relationship of the plurality of cells, wherein each cell cluster of the at least one cell cluster includes at least one cell of the first type and at least one cell of the first type or the second type adjacent to the at least one cell of the first type; and perform joint optimization of the uplink power control parameter on each cell cluster of the at least one cell cluster through the transmitter.

12. The device according to claim 11, wherein any cell of the first type in each cell cluster of the at least one cell cluster is spaced from any nearest cell of the first type by at most one cell of the second type.

13. The device according to claim 11, wherein determining the at least one cell cluster further comprises:
   determining one first cell of the first type as a member of the cell cluster;
   determining a second cell of the first type or a second cell of the second type, which is adjacent to the first cell of the first type in the cell cluster, as a member of the cell cluster; and
   determining a third cell of the first type, which is adjacent to a third cell of the second type in the cell cluster, as a member of the cell cluster.

14. The device according to claim 11, wherein the receiver is further configured to obtain the neighbor relationship of the plurality of cells.

15. The device according to claim 11, wherein performing the joint optimization further comprises:
   determining uplink power control adjustment parameters of cells in a first cell cluster of the at least one cell cluster; and
   sending the determined uplink power control adjustment parameters to the cells in the first cell cluster, for the cells in the first cell cluster to perform uplink power control adjustment.

16. The device according to claim 15, wherein determining the uplink power control adjustment parameters further comprises:
   determining a power control adjustment parameter of the first cell cluster based on a gradient of a load function, wherein the load function is a function of an average uplink load of the first cell cluster with respect to the uplink power control parameter of the first cell cluster, and the gradient is a partial derivative of the load function with respect to the uplink power control parameter of the first cell cluster.

17. The device according to claim 16, wherein determining the power control adjustment parameter of the first cell cluster further comprises:
   determining at least one candidate average uplink load based on the gradient of the load function, wherein the at least one candidate average uplink load is an average uplink load corresponding to a minimum value point of the load function;
   determining a smallest one of the at least one candidate average uplink load as an estimated average uplink load after adjustment of the first cell cluster; and
   determining the uplink power control parameter corresponding to the estimated average uplink load after adjustment as the uplink power control adjustment parameter of the first cell cluster.

18. The device according to claim 17, wherein determining the at least one candidate average uplink load further comprises:
   obtaining at least one extreme value point when the gradient of the load function is zero; and
   determining the average uplink load corresponding to one of the at least one extreme value point as one of the at least one candidate average uplink load.

19. The device according to claim 17, wherein determining the at least one candidate average uplink load further comprises:
   choosing at least one group of uplink power control adjustment parameters of the first cell cluster at random or based on a predetermined strategy; and
   determining, based on negative gradient curve of the gradient, an average uplink load corresponding to a minimum value point, to which one among the at least one group of first uplink power control parameters converges on the load function, as one of the at least one candidate average uplink load, wherein the one among the at least one group of uplink power control adjustment parameters comprises one uplink power control adjustment parameter of each cell in the cell cluster.

20. The device according to claim 17, wherein determining the at least one candidate average uplink load further comprises:
   randomly shifting one of the at least one candidate average uplink load on the curve corresponding to the load function, to obtain a shifted uplink power control parameter of the first cell cluster; and
   determining, based on negative gradient curve of the gradient equation, an average uplink load corresponding to a minimum value point to which the shifted uplink power control parameter converges on the load function as the candidate average uplink load.

* * * * *